United States Patent  
Ambrose et al.

(10) Patent No.: US 6,663,972 B2  
(45) Date of Patent: *Dec. 16, 2003

(54) MODIFIED AMINOPLAST CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Baden, PA (US); Jackie L. Smith, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/918,848

(22) Filed: Jul. 31, 2001

(65) Prior Publication Data

US 2002/0132935 A1 Sep. 19, 2002

Related U.S. Application Data

(63) Continuation-in-part of application No. 09/666,253, filed on Sep. 21, 2000, now Pat. No. 6,316,109.

(51) Int. Cl.$^7$ ............................................. C07D 265/12
(52) U.S. Cl. .................. 428/423.1; 428/413; 428/428; 428/500; 544/88; 544/89; 544/96; 528/406; 528/407; 525/329.9; 525/452; 525/437; 525/523; 525/403; 525/480; 525/502
(58) Field of Search ............................ 428/423, 1, 413, 428/428, 500; 544/88, 89, 96; 528/406, 407; 525/329.9, 452, 437, 523, 403, 480, 502

(56) References Cited

U.S. PATENT DOCUMENTS

| | | | |
|---|---|---|---|
| 3,759,854 A | 9/1973 | Wen-Hsuan Chang et al. | 260/21 |
| 3,904,623 A | 9/1975 | Shay et al. | 260/249.6 |
| 3,980,732 A | 9/1976 | Isaksen et al. | 260/850 |
| 4,185,045 A | 1/1980 | Yoshihara et al. | 525/181 |
| 4,189,421 A | 2/1980 | Shay et al. | 260/38 |
| 4,217,377 A | 8/1980 | Shay et al. | 427/195 |
| 4,230,829 A | 10/1980 | Yoshihara et al. | 525/504 |
| 4,393,181 A | 7/1983 | Allen | 525/504 |
| 4,607,091 A | 8/1986 | Schreiber | 528/96 |
| 4,698,401 A | 10/1987 | Klein et al. | 525/489 |
| 5,266,695 A | 11/1993 | Ishida | 544/73 |
| 5,302,462 A | 4/1994 | Shah et al. | 428/482 |

OTHER PUBLICATIONS

Subrayan, R.P.; Jones, F.N. *Chem. Mater.*, 1998, 10, 3506–1312, "Condensation of Substituted Phenols with Hexakis(methoxymethyl)melamine: Synthesis, Characterization, and Properties of Substituted 2,4,5–Tris[3,4–dihydro–1,3–(2H)–benzoxazin–3–yl]–striazine Derivatives".

Thackeray, J.W.; Orsula, G.W.; Rajaratnam, M.M.; Sinta, R.; Herr, D.; Pavelchek, E. *Proc. SPIE–Int. Soc. Opt. Eng.*, 1991, vol. 115, 170704, "Chemical Abstracts".

Braun, D.; Unvericht, R. *Angew. Makromol. Chem.*, 1995, 226, 183–195, "Model investigation of the co–condensation of melamine and phenol components in MPF thermoset moulding materials".

Tomita, B. *Polym. Prepr.*, 1983, 24(2), 165–166, "Co–Condensation Reaction Between Resol and Amino Resins".

Von Lampe, I.; Reinhardt, M.; Lokowski, H.–J.; Schnabel, W. *Agnew. Makromol. Chem.* 1994, 214, 197–210, "Photoreactions in halogen–containing negative–tone novolac resists".

Braun, D.; Ritzer, H. J. *Agnew. Makromol. Chem.* 1984, 125, 27–36, "Gemeinsame Kondensation von Phenol, Melamin und Formaldehyd".

*Primary Examiner*—Rachel Gorr  
(74) *Attorney, Agent, or Firm*—Diane R. Meyers; Deborah M. Altman

(57) ABSTRACT

A crosslinking agent having reactive benzoxazine groups is provided. The crosslinking agent is an ungelled reaction product of aminoplast resin, a polyhydric aromatic compound, and at least one compound having active hydrogen groups reactive with aminoplast resin which is selected from at least one of: (i) compounds having the structure (I):

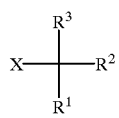

(I)

where X is aromatic; $R^1$, $R^2$, and $R^3$ each independently represents H, (cyclo)alkyl having from 1 to 12 carbon atoms, aryl, alkaryl, aralkyl, or an active hydrogen-containing group; (ii) compounds having structure (II) or (III):

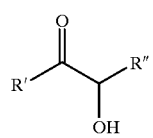

(II)

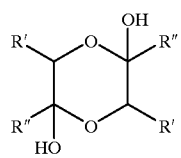

(III)

where R' and R" each independently represents an aromatic group or an alkyl group having 1 to 12 carbon atoms; and (iii) compounds different from (i) and (ii) and having a melting point of at least 80° C. Curable powder coating composition and multilayer composite coating compositions are also provided, as well as coated substrates.

67 Claims, No Drawings

MODIFIED AMINOPLAST CROSSLINKERS AND POWDER COATING COMPOSITIONS CONTAINING SUCH CROSSLINKERS

CROSS REFERENCE TO RELATED APPLICATION

This application is a continuation-in-part application of U.S. patent application Ser. No. 09/666,253, now U.S. Pat. No. 6,316,109 filed Sep. 21, 2000. Reference is made to related patent application Ser. Nos. 09/919,092; 09/919,219; 09/919,094; 09/918,983; and 09/918,788, filed concurrently herewith.

FIELD OF THE INVENTION

The present invention relates to crosslinking agents based on modified aminoplast resins and to curable powder coating compositions containing such crosslinking agents.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate and/or epoxy functional resins, such as acrylic and polyester resins having relatively high glass transition temperatures ("$T_g$"), are commonly used as main film-forming polymers for these coatings. The relatively high $T_g$ of such acrylic polymer systems provides powder coatings having good storage stability. However, when exposed to the extreme temperatures which can be encountered in many geographic areas during shipping and/or storage even better powder coating stability is desired. By "storage stability" is meant the ability of the individual powder particles which comprise the powder coating to resist the tendency to adhere to one another, thereby causing "clumping" or "fusing" of the powder coating composition upon storage prior to application. Powder coating compositions having very poor storage stability can be difficult, if not impossible, to apply.

Aminoplast resins are well known in the art as low cost crosslinking agents for hydroxyl, carboxyl and/or carbamate functional polymers in conventional liquid coating compositions. Common aminoplast resins are based on condensation products of formaldehyde with an amino- or amido-group carrying substance. Condensation products obtained from the reaction of alcohols and formaldehyde with melamine, urea or benzoguanamine are most commonly used in liquid coating compositions where they can provide enhanced coating properties such as exterior durability chemical resistance and mar resistance. Such aminoplast resins typically are in liquid form and, as such, generally may not be suitable for use in curable powder coating compositions.

The alkoxylated aldehyde condensates of glycoluril, which are solid products, are the aminoplast resins most commonly employed as crosslinking agents in powder coating compositions. Although in solid form, these materials nonetheless can depress the $T_g$ of the powder coating composition significantly, even when combined with high $T_g$ film-forming polymers such as the acrylic polymers described above. Such a depression in $T_g$ also can result in poor powder stability.

Moreover, the use of conventional aminoplast resins in curable powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating and, as the viscosity of the coating increases during the curing process, pinholes or craters can be formed as gases escape through coating surface.

U.S. Pat. Nos. 3,904,623, 4,189,421 and 4,217,377 disclose a solid, non-gelled low molecular weight addition reaction product and a method for preparing the reaction product. The addition reaction product is suitable for use as a crosslinking agent in powder coating compositions when combined with polymers having various reactive functional groups. The crosslinking agent is the reaction product of 1.8 to 2.2 moles of a monohydroxy-, single-ring, aromatic compound, for example, phenol, and 1.0 mole of an alkoxymethyl aminotriazine compound, such as hexakis (methoxymethyl aminotriazine.

U.S. Pat. No. 4,393,181 discloses solid adducts prepared from aminotriazine compounds and a large excess of polyhydric phenols. The adducts, due to their phenolic functionality, are useful as crosslinking agents for epoxy resins in powder coating compositions when used in conjunction with a curing agent accelerator such as an imidazole or benzimidazole.

U.S. Pat. No. 3,759,854 discloses heat-fusible powder coating compositions comprising a crosslinker prepared by pre-reacting a thermosetting polyester resin and a suitable conventional aminoplast crosslinking resin such as a condensation product of an aldehyde with melamine, urea or benzoguanamine.

U.S. Pat. No. 5,302,462 discloses a similar process for preparing a partially cured powder coating crosslinker. The crosslinker is prepared by partially reacting a less than stoichiometric amount of methoxymethyl aminotriazine with a substantially linear, hydroxyl-terminated polyester.

U.S. Pat. No. 3,980,732 discloses a process for preparing a curable powder resin composition having a sintering temperature above 40° C. The method comprises partially reacting a methylolamino compound with an aliphatic alcohol and an aliphatic diamide to produce an aminoplast condensate with a $T_g$ ranging from −10° C. to 100° C. and blending the aminoplast condensate with an acrylic or polyester resin having a glass transition temperature ranging from 60° C. to 100° C.

U.S. Pat. No. 4,185,045 discloses a powder coating composition comprising a solid crosslinking agent having a softening point ranging from 50° C. to 120° C. and prepared by heating 40 to 75% by weight of an acrylic polyol and 60 to 25% by weight of an alkoxyaminotriazine at 50° to 120°, and a base resin having a softening point ranging from 60° C. to 130° C.

U.S. Pat. No. 4,230,829 discloses a solid crosslinking agent having a softening point of 50° C. to 120° C. and prepared by heating 40 to 70% by weight of a polyester polyol and 60 to 30% by weight of an alkoxyaminotriazine.

While the above-described prior art aminoplast-based crosslinkers for powder coating compositions provide some improvement for gassing and powder stability over their liquid aminoplast counterparts, the powder coating compositions containing these crosslinkers can, nonetheless, exhibit some of the aforementioned deficiencies. In addition, most of the crosslinkers disclosed in the prior art can be high molecular weight, high viscosity and/or partially cured and, hence, unstable mixtures. Further, the crosslinkers described in U.S. Pat. Nos. 3,904,623, 4,189,421, and 4,217,377 can contain a significant amount of unreacted phenol impurity, which can significantly limit their use in the powder coatings industry.

Thus, there remains a need for an aminoplast crosslinking agent suitable for use in curable powder coating compositions which provides a storage stable powder composition having the desirable coating properties usually associated with aminoplast-based liquid coatings without causing coating surface defects due to gassing.

SUMMARY OF THE INVENTION

In accordance with the present invention, a crosslinking agent having reactive benzoxazine groups is provided. The crosslinking agent comprises an ungelled reaction product of (A) one or more aminoplast resins, (B) one or more polyhydric aromatic compounds; and (C) at least one compound different from (B) having active hydrogen groups reactive with aminoplast resin (A). The compound (C) is selected from at least one of (i) compounds having the following structure (I):

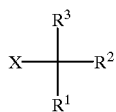

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (A); and (ii) compounds having the following structure (II or III):

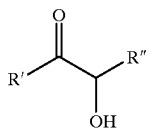

(II)

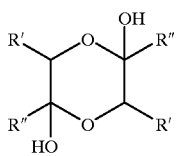

(III)

where R' and R" are the same or different and each independently represents an aromatic group or an alkyl group having 1 to 12 carbon atoms; and (iii) compounds different from both (i) and (ii) and having a melting point of at least 80° C., and mixtures thereof. The crosslinking agent has a glass transition temperature of at least 10° C. and is essentially free of functional groups which are reactive with aminoplast resin.

The present invention is also directed to a method for preparing the aforementioned crosslinking agent. The method comprises the steps of (1) combining the reactants (A), (B), and (C) described above to form a reaction admixture; (2) heating the reaction admixture formed in step (1) to a temperature ranging from 90° C. to 135° C.; and (3) maintaining the temperature achieved in step (2) for a time sufficient to produce an ungelled reaction product having a glass transition temperature of at least 10° C. which is essentially free of functional groups reactive with aminoplast resin as determined by infrared spectroscopy.

The present invention is also directed to a curable powder coating composition comprising a solid particulate, film-forming mixture of (1) at least one polymer having functional groups reactive with aminoplast resin and/or benzoxazine groups, the polymer having a glass transition temperature of at least 30° C. and (2) the above-described crosslinking agent.

Further provided is a multilayer composite coating composition comprised of a base coat deposited from a film-forming base coating composition and a top coat deposited from the curable powder coating composition described above. Coated substrates are also provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As mentioned above, the crosslinking agent of the present invention comprises the ungelled reaction product of (A) one or more aminoplast resins, (B) one or more polyhydric aromatic compounds, and (C) at least one compound different from (B) having active hydrogen groups reactive with aminoplast resin (A). The compound (C) is selected from at least one of (i) compounds having the structure (I) above, where X, $R^1$, $R^2$, and $R^3$ are as described above for that structure, and (ii) compounds having the structure (II) or (III) above, where R', and R" are as described above for the structures, and (iii) compounds different from (i) and (ii) and having a melting point of at least 80° C. The crosslinking agent has a glass transition temperature of at least 10° C. and is essentially free of functional groups which are reactive with aminoplast resin.

By "ungelled" is meant that the reaction product can be dissolved in a suitable solvent or resin and has an intrinsic viscosity when so dissolved. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified and remelted.

The aminoplast resins suitable for use in the preparation of the crosslinking agent of the present invention as component (A) include those which are or are derived from at least one of glycoluril, aminotriazine and benzoguanamine. Such compounds include, for example, alkoxyalkyl derivatives of melamine, glycoluril, benzoguanamine, acetoguanamine, formoguanamine, spiroguanamine and the like.

Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris (ethylamino)-1,3,5 triazine.

While the aldehyde employed is most often formaldehyde, similar condensation products can be made from other aldehydes, such as acetaldehyde, crotonaldehyde, acrolein, benzaldehyde, furfural and glyoxal.

The aminoplast resins can contain methylol or other alkylol groups, and in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol and others, as well as, benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

In one embodiment of the present invention, the aminoplast resins comprise highly alkylated, low imino aminoplast resins which have a degree of polymerization ("DP") of less than 2.0, often less than 1.8, and typically less than 1.5. Generally, the number average degree of polymerization is defined as the average number of structural units per polymer chain (see George Odian, *Principles of Polymerization*, John Wiley & Sons (1991)). For purposes of the present invention, a DP of 1.0 would indicate a completely monomeric triazine structure, while a DP of 2.0 indicates two triazine rings joined by a methylene or methylene-oxy bridge. It should be understood that the DP values reported herein and in the claims represent average DP values as determined by gel permeation chromatography data.

Non-limiting examples of suitable aminotriazine compounds include alkoxyalkyl aminotriazines, such as (methoxymethyl)melamine-formaldehyde resin, for example RESIMENE® CE-7103 commercially available from Solutia, Inc., and CYMEL® 300; ethylated-methylated benzoguanamine-formaldehyde resin, for example CYMEL® 1123; and methylated-butylated melamine-formaldehyde resin, for example CYMEL® 1135, which are commercially available from Cytec Industries, Inc.

The polyhydric aromatic compound (B) used to prepare the crosslinking agent of the present invention can be any of a variety of polyhydric aromatic compounds well-known in the art. Dihydric aromatic compounds are most often employed. Typically, the polyhydric aromatic compound (A) is represented by the following structure (IV) or (V):

$$HO\text{-}\Phi^1\text{-}Y\text{-}\Phi'^1\text{-}OH \quad (IV)$$

$$HO\text{-}\Phi^2 OH \quad (V)$$

where $\Phi^1$, $\Phi'^1$ and $\Phi^2$ are the same or different and each independently represents a divalent aromatic group; and Y represents a polyvalent linking group.

By "divalent aromatic group" is meant any divalent group derived from a substituted or unsubstituted aromatic compound. Examples of suitable substituent groups can include alkyl, alkoxy, aryl, and alkaryl groups, or heteroatoms such as nitrogen, oxygen and halogen atoms, for example chlorine and bromine, provided that at least one of the positions ortho to each OH group is hydrogen-substituted.

The polyvalent linking group Y can be any polyvalent atom or radical, for example oxygen, sulfur, —SO—, —SO₂—, divalent hydrocarbon radicals containing up to 10 carbon atoms and sulfur-, silicon- or nitrogen-containing hydrocarbon radicals. In one embodiment of the present invention, Y is a divalent $C_3$ hydrocarbon radical.

In another embodiment of the invention, the polyhydric aromatic compound (B) is selected 4,4'-isopropylidenediphenol (i.e., Bisphenol A), bis(4-hydroxyphenyl)methane, 2,2'-biphenol, dihydroxynaphthalene, resorcinol, hydroquinone, catechol and mixtures thereof. The polyhydric aromatic compound typically employed is 4,4'-isopropylidenediphenol.

As aforementioned, in addition to the aminoplast resin (A) and the polyhydric aromatic compound (B) described immediately above, the reactants used to form the crosslinking agent of the present invention further comprise (C) at least one compound different from (B) having active hydrogen groups reactive with aminoplast resin (A). As previously discussed, compound (C) is selected from at least one of (i) compounds having the following structure (I):

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group which is reactive with the aminoplast resin (A), provided that at least one of $R^1$, $R^2$, and $R^3$ represents an active hydrogen-containing group which is reactive with the aminoplast resin (A); (ii) compounds having the following structure (II or III):

(II)

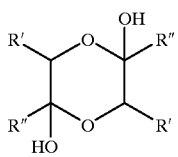

(III)

where R' and R" are the same or different and each independently represents an aromatic group or an alkyl group having 1 to 12 carbon atoms; and (iii) compounds different from both (i) and (ii) and having a melting point of at least 80° C. Mixtures of any combination of compounds (i), (ii) and (iii) can be used. As used herein, by "(cyclo)alkyl" is meant both alkyl and cycloalkyl groups.

In one embodiment of the present invention, compound (C) comprises at least one of compound (i) having the previously described structure (I). As aforementioned, the substituent group X represents an aromatic, for example, phenyl, and substituted phenyl groups, or a cycloaliphatic group, for example, cyclohexyl. These groups can be any fused or bridged ring structures such as naphthyl, anthracyl, and benzofuranyl. Also, the aromatic groups can be unsubstituted or substituted with heteroatoms, for example O, N and S. Non-limiting examples of aromatic groups suitable as the substituent include phenyl, naphthyl, anthracyl, pyrene, benzofuranyl, and the like.

As previously mentioned, at least one of $R^1$, $R^2$, and $R^3$ represents a group comprising an active hydrogen-containing group reactive with the aminoplast resin (A) such as a group selected from hydroxyl, amide, amine, carboxylic acid, carbamate, urea, thiol, and combinations thereof. In one embodiment of the present invention, compound (C) comprises at least one compound having the structure (I) above wherein at least one of $R^1$, $R^2$, and $R^3$ represents a group comprising at least one hydroxyl group. Non-limiting examples of active hydrogen-containing compounds suitable for use as the reactant (c)(i) include benzyl alcohol and substituted benzyl alcohols such as 3-phenoxybenzyl alcohol and 4-methoxybenzyl alcohol, phenethyl alcohol, benzopinacol, N-benzylformamide, benzyl lactate, benzyl mandelate, benzyl mercaptan, N-benzylmethamine, 3-furanmethanol, furfuryl alcohol, pyridylcarbinols, for example, 2-pyridylcarbinol, and 3-pyridylcarbinol, 1-pyrenemethanol, 9-anthrancenemethanol, 9-fluorenemethanol, 9-hydroxyfluorene, 9-hydroxyxanthene, 9-phenylxanthen-9-ol, 4-stilbenemethanol and triphenylmethanol.

In another embodiment of the present invention, the active hydrogen containing compound (C) (ii) comprises compounds having the following structure (II):

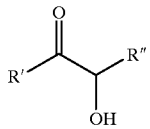

(II)

or dimer derivatives thereof as discussed below, where R' and R" are the same or different and each independently represents an aromatic group or an alkyl group having 1 to 12 carbon atoms. In one embodiment of the present invention, one or both of the substituent groups R' and R" are aromatic groups, for example phenyl, naphthyl, methoxy phenyl, and dimethylaminophenyl groups.

Also, suitable aromatic groups can contain one or more heteroatoms, such as O, N and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles and triazoles. Non-limiting examples of such compounds include anisoin, pyridoin, furoin, bufyroin.

In one particular embodiment of the present invention, the active hydrogen-containing compound (c)(ii) comprises an active hydrogen-containing compound selected from benzoin, hydroxycyclohexyl phenylketone, and mixtures thereof.

Compounds having the general structure (II) above are known to form dimeric derivatives, particularly when R' and R" are alkyl (Merck Index, 11ed, p 10, 55).

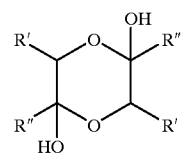

(III)

Such dimer derivatives can have the structure (III) above where R' and R" are as described above for the structure (II).

In yet another embodiment of the present invention, the active hydrogen-containing compound (C) comprises at least one of compound (iii), which is different from both (i) and (ii) and has a melting point of at least 80° C. The melting point of a compound can be determined by using a standard capillary melting point apparatus or by thermal analysis (ASTM E974–95).

Generally, the melting point of the active hydrogen containing compound (C)(iii) is less than 250° C., usually less than 220° C., and typically less than 200° C. Also, the melting point of the active hydrogen containing compound (C)(iii) generally is at least 80° C., usually at least 90° C., and typically at least 100° C. The melting point of the active hydrogen containing compound (C)(iii) can range between any combination of these values inclusive of the recited values. Nonlimiting examples of compounds suitable for use as reactant (C)(iii) include mono-alcohols such as borneol, norborneol, isoborneol, 1-adamantanemethanol, 1-adamantanol, 2-methyl-2-adamantanol and 5-norbornen-2-ol; secondary amides, such as aliphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4,3,1,1(3,8))undecan-5 one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamide-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes urethanes such as those obtained by reacting high melting point mono-alcohols (such as those described immediately above) with suitable mono-isocyanates.

The active hydrogen-containing compound (C) can comprise one or more of compounds, (C)(i), (C)(ii), and (C)(iii). Inclusion of the active hydrogen-containing containing compound (C) as a reactant in the preparation of the crosslinking agent of the present invention can provide several advantages. First, reaction of the active hydrogen-containing compound (C) with the aminoplast resin (A) can generally increase the $T_g$ of the resultant crosslinker as compared to an analogous crosslinking agent having no such modification. Also, compounds such as (C)(i), (C)(ii), and (C)(iii) described above can allow for the reaction of more alkoxy groups of the aminoplast resin (A) without resulting in a gelled reaction product. Such a crosslinking agent when incorporated into curable powder coating compositions can effect less gassing upon curing. Furthermore, when crosslinking agents of the present invention are used in curable powder coating compositions, the degassing agent may be released in situ. This can reduce adverse effects, for example, yellowing of the film, which can be caused by the presence of the degassing agent during curing processes.

The present invention is also directed to a method for preparing the above-described crosslinking agent. The aminoplast resin (A), the polyhydric aromatic compound (B), and active hydrogen-containing compound (C) are combined in a suitably equipped reaction vessel, typically with a suitable solvent and an appropriate strong acid as catalyst. Any suitable solvent can be used, with aromatic solvents typically being employed. Non-limiting examples of suitable aromatic solvents include xylene, toluene, and mixtures thereof. Non-limiting examples of strong acids suitable for use as a catalyst include, but are not limited to, para-toluene sulfonic acid and dodecyl benzene sulfonic acid. Normal condensation techniques as are well-known in the art can be used. The reaction admixture can be heated to a temperature ranging from 90° to 135° C., typically from 100° C. to 125° C., and held at that temperature for a period sufficient to obtain an ungelled product having a $T_g$ of at least 10° C. The reaction is terminated when a pre-determined end point (e.g., the disappearance of the OH signal) is detected by infrared spectroscopy or other suitable analytical technique.

In the preparation of the crosslinking agent of the present invention the aminoplast resin (A), the polyhydric aromatic compound (B), and the active hydrogen-containing compound (C) are combined such that the equivalents of aminoplast resin (A) are in excess relative to the combined equivalents of the polyhydric aromatic compound (B) and the active hydrogen-containing compound (C). This results in a stable crosslinking agent which is essentially free of functional groups that are reactive with aminoplast resin and/or benzoxazine groups. The reaction is monitored for the disappearance of such functionality relative to an internal standard via infrared spectroscopy or other appropriate analytical technique (e.g., the hydroxyl signal is compared to the signal of a structure which will remain essentially unchanged as the reaction proceeds to completion, for example, the C-H stretch signal). By "stable" crosslinking agent is meant that the crosslinking agent is essentially free of any functionalities that can be reactive with the aminoplast resin and no further reaction will occur when the composition is continuously heated at the designated temperatures; i.e., the crosslinking agent will not self-condense.

Generally, in the preparation of the crosslinking agent of the present invention, the ratio of moles of aminoplast resin (A) to the total combined moles of the polyhydric aromatic compound (B) and the active hydrogen-containing compound (C) ranges from 1.5 to 5.0:1, often from 1.8 to 4.0:1, and typically from 1.9 to 3.6:1. Additionally, when the aminoplast resin (A) comprises an (alkoxyalkyl) aminotriazine, it should be understood that the theoretical molecular weight of the monomeric aminotriazine (that is, where DP=1) is used to calculate the "molar ratio".

The crosslinking agent of the present invention generally has a glass transition temperature of at least 10° C., often at least 15° C., usually at least 20° C., and typically at least 25° C. Also, the crosslinking agent generally has a glass transition temperature less than 100° C., often less than 90° C., usually less than 85° C., and typically less than 80° C. The glass transition temperature of the crosslinking agent can range between any combination of these values, inclusive of the recited values.

The $T_g$ of the crosslinking agent of the present invention can be calculated or measured experimentally using differential scanning calorimetry (rate of heating 10° C. per minute, $T_g$ taken at the first inflection point). Unless otherwise indicated, the stated $T_g$ as used herein and in the claims refers to the measured $T_g$.

The above-described reaction generally results in a crosslinking agent having both reactive aminoplast groups (for example, (methoxymethyl) aminotriazine groups) and benzoxazine groups. The benzoxazine structures formed in the syntheses described above may be confirmed by NMR spectroscopy data.

By way of example, the reaction of a monomeric hexa (methoxymethyl)melamine with Bisphenol A is represented structurally below.

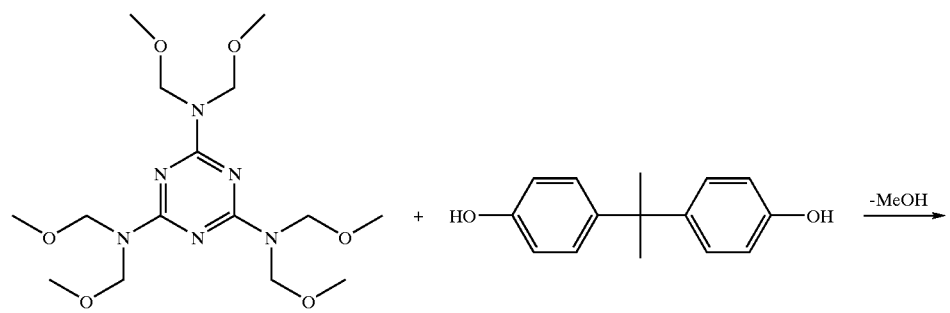

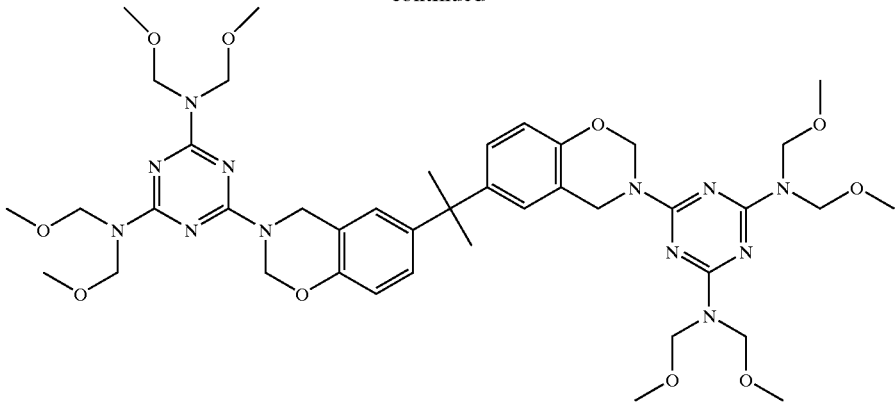

In addition to the normal crosslinking reactions of the residual methoxymethyl group, the benzoxazine ring can open under appropriate reaction conditions to form the crosslinking structures shown below:

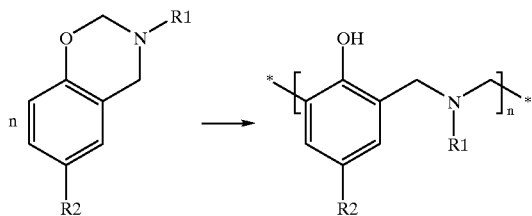

where $R^1$ represents the residual structure from the aminoplast resins and $R^2$ represents any appropriate substituents on the aryl ring of the starting material as detailed above.

As mentioned above, the present invention also relates to a curable powder coating composition comprising a solid particulate, film-forming mixture of (1) a polymer having functional groups reactive with aminoplast and/or benzoxazine groups and having a glass transition temperature of at least 30° C., and (2) the crosslinking agent described above.

Curable powder coatings are particulate compositions that are solid and free flowing at ambient room temperature. As mentioned above, the curable powder coating compositions of the present invention comprise, as a first component (1) at least one aminoplast- and/or benzoxazine-reactive functional group-containing polymer having a glass transition temperature of at least 30° C., e.g., a hydroxyl and/or an epoxide functional acrylic polymer, and, as component (2), the crosslinking agent described above. The components (1) and (2) of the curable powder coating composition each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

Also, as used herein and in the claims, the term "polymer" is intended to refer to oligomers and both homopolymers and copolymers. Unless stated otherwise, as used in the specification and the claims, molecular weights are number average molecular weights for polymeric materials indicated as "Mn" and obtained by gel permeation chromatography using a polystyrene standard in an art-recognized manner.

The polymer (1) can be any of a variety of polymers having aminoplast and/or benzoxazine reactive functional groups as are well known in the art, so long as the $T_g$ of the polymer is sufficiently high to permit the formation of a stable, solid particulate composition. The $T_g$ of the polymer (1) generally is at least 30° C., usually at least 40° C., and typically at least 50° C. The $T_g$ of the polymer (1) also generally is less than 130° C., usually less than 100° C., and typically less than 80° C. The $T_g$ of the functional group-containing polymer (1) can range between any combination of these values inclusive of the recited values.

Non-limiting examples of polymers having aminoplast- and/or benzoxazine-reactive functional groups useful in the curable powder coating compositions of the invention as the polymer (1) include those selected from the group consisting of acrylic, polyester, polyurethane, polyepoxide, and polyether polymers. The polymer (1) can comprise a wide variety of aminoplast and/or benzoxazine-reactive functional groups, for example, hydroxyl, carboxyl, anhydride, epoxy, phenolic, amine, thiol and/or amide functional groups. In one particular embodiment of the present invention, the polymer (1) can comprise aminoplast- and/or benzoxazine-reactive functional groups selected from hydroxyl, epoxy, carboxyl and/or carbamate functional groups, with hydroxyl and/or carbamate functional groups often employed.

In one embodiment of the present invention, the polymer (1) comprises hydroxyl and/or carbamate functional groups. Hydroxyl and/or carbamate functional group-containing acrylic polymers and/or polyester polymers can be utilized readily. In another embodiment of the invention, the polymer (1) comprises epoxy and/or hydroxyl functional groups.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl (meth)acrylate, ethyl (meth)acrylate, butyl (meth)acrylate. As used herein, by "(meth)acrylate" and like terms is meant both methacrylates and acrylates. Ethylenically unsaturated carboxylic acid functional monomers, for example acrylic acid and/or methacrylic acid, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate.

In one embodiment, the acrylic polymers contain hydroxyl functionality which can be incorporated into the acrylic polymer through the use of hydroxyl functional monomers such as hydroxyethyl (meth)acrylate and hydroxypropyl (meth)acrylate which may be copolymerized with the other acrylic monomers mentioned above.

The acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those which are commercially available from Shell Chemical Company under the tradename CARDURAE® E; and from Exxon Chemical Company under the tradename GLYDEXX®-10.

Alternatively, the beta-hydroxy ester functional monomers can be prepared from an ethylenically unsaturated, epoxy functional monomer, for example glycidyl methacrylate and allyl glycidyl ether, and a saturated carboxylic acid, such as a saturated monocarboxylic acid, for example, isostearic acid.

The hydroxyl group-containing acrylic polymers useful in the compositions of the present invention generally have a hydroxyl value ranging from 10 to 150, usually from 15 to 90, and typically from 20 to 50.

The acrylic polymer generally is prepared by solution polymerization techniques in the presence of suitable initiators such as organic peroxides or azo compounds, for example, benzoyl peroxide or N,N-azobis(isobutyronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth) acrylate and allyl glycidyl ether, with one or more ethylenically unsaturated monomers that are free of epoxide functionality, e.g., methyl (meth)acrylate, isobornyl (meth) acrylate, butyl (meth)acrylate and styrene. Examples of epoxide functional ethylenically unsaturated monomers that may be used in the preparation of epoxide functional acrylic polymers include, but are not limited to, glycidyl (meth) acrylate, 3,4-epoxycyclohexylmethyl (meth)acrylate, 2-(3, 4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

The functional group-containing acrylic polymer can have a Mn ranging from 500 to 30,000 and typically from 1000 to 5000. If carbamate functional, the acrylic polymer generally can have a calculated carbamate equivalent weight typically within the range of 15 to 150, and typically less than 50, based on equivalents of reactive carbamate groups.

Non-limiting examples of functional group-containing polyester polymers suitable for use as the polymer (1) in the curable powder coating compositions of the present invention can include linear or branched polyesters having hydroxyl, carboxyl and/or carbamate functionality. Such polyester polymers generally are prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols usually employed in the preparation of the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like. Branched polyols, such as trimethylolpropane, are preferred for use in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, higher carboxylic acids, such as trimellitic acid and tricarballylic acid can be used. Where acids are referred to above, it is understood that anhydrides thereof may be used in place of the acid. Also, lower alkyl esters of diacids such as dimethyl glutarate and dimethyl terephthalate can be used. Because it is readily available and low in cost, terephthalic acid is used primarily.

Pendent and/or terminal carbamate functional groups can be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

The functional group-containing polyester polymer generally has a Mn ranging from 500 to 30,000, usually about 1000 to 5000. If carbamate functional, the polyester polymer generally has a calculated carbamate equivalent weight within the range of 15 to 150, typically 20 to 75, based on equivalents of reactive pendent or terminal carbamate groups.

Non-limiting examples of suitable polyurethane polymers having pendent and/or terminal hydroxyl and/or carbamate functional groups include the polymeric reaction products of polyols, which are prepared by reacting the polyester polyols or acrylic polyols, such as those mentioned above, with a polyisocyanate such that the OH/NCO equivalent ratio is greater than 1:1 such that free hydroxyl groups are present in the product. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include aliphatic or aromatic polyisocyanates or a mixture of the two. Diisocyanates are preferred, although higher polyisocyanates can be used in place of or in combination with diisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate and trimethyl hexamethylene. Also, cycloaliphatic diisocyanates can be employed. Examples include isophorone diisocyanate, tetramethyl xylenediisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer.

The hydroxyl and/or carbamate functional group-containing polyurethane polymers generally have a Mn ranging from 500 to 20,000, typically from 1000 to 5000. If carbamate functional, the polyurethane polymer generally has a carbamate equivalent weight within the range of 15 to 150, typically 20 to 75, based on equivalents of reactive pendent or terminal carbamate groups.

For some applications it may be desirable to employ a functional group-containing polyether polymer in the curable powder coating compositions of the present invention. Suitable hydroxyl and/or carbamate functional polyether polymers can be prepared by reacting a polyether polyol with urea under reaction conditions well known to those skilled in the art. Usually, such polyether polymers are prepared via a transcarbamoylation reaction similar to the reaction described above in connection with the incorporation of carbamate groups into the acrylic polymers.

Examples of polyether polyols are polyalkylene ether polyols which include those having the following structural formulae (VI) and (VII):

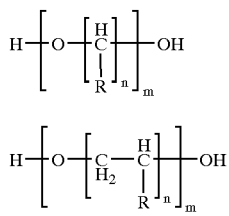

where the substituent R is hydrogen or lower alkyl containing from 1 to 5 carbon atoms including mixed substituents, n is typically from 2 to 6, and m is from 8 to 100 or higher. Note that the hydroxyl groups, as shown in structures (VI) and (VII) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE® and TERACOL®, available from E. I. du Pont de Nemours and Company, Inc. and POLYMEG®, available from Q O Chemicals, Inc., a subsidiary of Great Lakes Chemical Corp.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Suitable functional group-containing polyether polymers typically have a Mn ranging from 500 to 30,000 and usually from 1000 to 5000. If carbamate functional, the polyether polymers have a carbamate equivalent weight of within the range of 15 to 150, usually 25 to 75, based on equivalents of reactive pendent and/or terminal carbamate groups and the solids of the polyether polymer.

It should be understood that the carbamate functional group-containing polymers can contain residual hydroxyl functional groups which provide additional crosslinking sites. Usually, the carbamate/hydroxyl functional group-containing polymer (1) can have a residual hydroxyl value ranging from 0.5 to 10, often from 1 to 10, and typically from 2 to 10 (mg KOH per gram).

The functional group-containing polymer (1) generally is present in the curable powder coating compositions of the present invention in an amount ranging from at least 5 percent by weight, usually at least 20 percent by weight, often at least 30 percent by weight, and typically at least 40 percent by weight based on the total weight of the film-forming composition. The functional group-containing polymer (A) also generally is present in the curable powder coating compositions of the present invention in an amount less than 95 percent by weight, usually less than 90 percent by weight, often less than 85 percent by weight, and typically less than 80 percent by weight based on the total weight of the curable powder coating composition. The amount of the functional group-containing polymer (1) present in the powder coating compositions of the present invention can range between any combination of these values inclusive of the recited values.

As mentioned above, the powder coating compositions of the present invention further comprise, as component (2), the crosslinking agent described above. The crosslinking agent (2) generally is present in the powder coating compositions of the present invention in an amount ranging from at least 5 percent by weight, usually at least 10 percent by weight, often at least 15 percent by weight, and typically at least 20 percent by weight based on the total weight of the powder coating composition. The crosslinking agent (2) also generally is present in the powder coating compositions of the present invention in an amount less than 95 percent by weight, usually less than 80 percent by weight, often less than 70 percent by weight, and typically less than 60 percent by weight based on the total weight of the powder coating composition. The amount of the crosslinking agent (2) present in the powder coating compositions of the present invention can range between any combination of these values inclusive of the recited values.

If desired, the curable powder coating compositions of the present invention also can include an adjuvant curing agent different from the crosslinking agent (2). The adjuvant curing agent can be any compound having functional groups reactive with the functional groups of the polymer (1) and/or the crosslinking agent (2) described above. Non-limiting examples of suitable adjuvant curing agents include, for example, blocked isocyanates, aminoplast resins such as those described above with reference to aminoplast resin (A), triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the curable powder coating compositions, the isocyanates are unblocked and the isocyanate groups become available to react with the functional groups of the polymer (1).

Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with epsilon-caprolactam; toluene 2,4-toluene diisocyanate blocked with epsilon-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon-caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset, N.J.

Conventional aminoplast crosslinkers (for example, those in liquid form) can be used as the adjuvant curing agent provided that the $T_g$ of the coating is not lowered to an undesirable extent. Suitable adjuvant curing agents include aminoplast resins such as the aldehyde condensates of glycoluril, including those mentioned above. Glycoluril resins suitable for use as the adjuvant curing agent in the curable powder coating compositions of the invention include POWDERLINK® 1174 commercially available from Cytec Industries, Inc. of Stamford, Conn.

When employed, the adjuvant curing agent typically is present in the curable powder coating compositions of the present invention in an amount ranging from 0.5 to 20 percent by weight, and preferably from 1 to 15 percent by weight based on the total weight of the curable powder coating composition.

Also suitable for use as an adjuvant curing agent in the curable powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and preferably from about 1 to 20 percent by weight, percent by weight based on the total weight of the powder coating composition.

Mixtures of the above-described adjuvant curing agents also can be used advantageously.

Also, it should be understood that for purposes of the present invention, the curable powder coating compositions which contain epoxy group-containing polymers, typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for subsequent reaction with the aminoplast-based crosslinking agent (2).

Epoxide-reactive curing agents which can be used in curable powder coating compositions comprising an epoxide functional polymer may have functional groups selected from the group consisting of hydroxyl, thiol, primary amines, secondary amines, acid (e.g. carboxylic acid) and mixtures thereof.

Useful epoxide reactive curing agents having amine functionality include, for example, dicyandiamide and substituted dicyandiamides. Typically, the epoxide reactive curing agent has carboxylic acid groups.

In one embodiment of the present invention, the epoxide reactive crosslinking agent has carboxylic acid functionality and is substantially crnystalline. By "crystalline" is meant that the co-reactant contains at least some crystalline domains, and correspondingly may contain some amorphous domains. While not necessary, the epoxide reactive crosslinking agent can have a melt viscosity less than that of the epoxy functional polymer (at the same temperature). As used herein and in the claims, by "epoxide reactive crosslinking agent" is meant that the epoxide reactive crosslinking agent has at least one, typically two functional groups that are reactive with epoxide functionality.

The epoxide reactive crosslinking agent can include a carboxylic acid functional curing agent which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional curing agents include those represented by the following general formula (VIII),

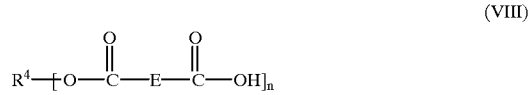

(VIII)

In general formula (VIII), $R^4$ is the residue of a polyol, E is a divalent linking group having from 1 to 10 carbon atoms, and n is an integer of from 2 to 10. Examples of polyols from which $R^4$ of general formula (VIII) may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carbonylic acid-1,2-phenylene. The divalent linking group E is preferably aliphatic.

The curing agent represented by general formula (VIII) typically is prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula (VIII) as follows, $R^4$ is the residue of trimethylol propane, E is the divalent linking group 4-methyl-1,2-cyclohexylene, and n is 3. Carboxylic acid functional curing agents described herein with reference to general formula (VIII) also are meant to include any unreacted starting materials and/or co-products, e.g., oligomeric species, resulting from their preparation and contained therein.

Curable powder coating compositions comprising an epoxide functional polymer and an epoxide reactive curing agent can also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide reactive curing agents contain both in a total amount ranging from 50 percent to 99 percent by weight, based on the total weight of the composition, e.g., from 70 percent to 85 percent by weight, based on the total weight of the composition. The epoxide reactive curing agent is typically present in the curable powder coating composition in an amount corresponding to a portion of these recited ranges, i.e., 5 to 40, particularly 15 to 30, percent by weight, based on the total weight of the composition. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as reactant (1) and an epoxide reactive curing agent generally contain the crosslinking agent (2) in an amount ranging from 1 to 50 weight percent, usually from 2 to 40 weight percent and typically from 15 to 30 weight percent based on total weight of the powder coating composition.

The curable powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; colorants, such as pigments (e.g., carbon black or Shepard Black pigments) and dyes; UV light stabilizers such as TINUVIN® 123 or TINUVIN® 900 available from CIBA Specialty Chemicals and catalysts to promote the various crosslinking reactions.

Such additives are typically present in the curable powder coating compositions of the present invention in an amount ranging from 1 to 20 weight percent based on total weight of the powder coating composition The curable powder coating compositions of the invention are typically prepared by blending the functional group-containing polymer (1) and the crosslinking agent (2), along with any adjuvants, additives and catalyst, if employed, for approximately 1 minute in a Henschel blade blender. The mixture is then extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The curable powder coating compositions of the invention can be applied to a variety of substrates including metallic substrates, for example, aluminum and steel substrates, and non-metallic substrates, for example, thermoplastic or thermoset composite substrates. The curable powder coating compositions typically are applied by spraying, and in the case of a metal substrate by electrostatic spraying, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the curable powder coating composition, the powder coated substrate is heated to a temperature sufficient to cure the coating, generally to a temperature ranging from 250° F. to 500° F. (121.1° C. to 260.0° C.) for 1 to 60 minutes, and typically from 300° F. to 400° F. (148.9° C. to 204.4° C.) for 15 to 30 minutes.

The curable powder coating composition can be applied as a primer or primer surfacer, or as a top coat, for example, a "monocoat". The curable powder coating composition of the invention also can be employed advantageously as a top coat in a multi-component composite coating composition. Such a multi-component composite coating composition generally comprises a base coat deposited from a film-forming base coating composition and a top coat applied over the base coat, the top coat being deposited from the curable powder coating composition of the present invention. In one particular embodiment, the multi-component composite coating composition is a color-plus-clear system where the base coat is deposited from a pigmented film-forming coating composition and the top coat is deposited from a curable powder coating composition which is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and often a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, also can be used as the base coat composition.

As mentioned above, the base coat compositions also contain pigments of various types as colorants. Suitable metallic pigments include aluminum flake, bronze flake, copper flake and the like. Other examples of suitable pigments include mica, iron oxides, lead oxides, carbon black, titanium dioxide, talc, as well as a variety of color pigments.

Optional ingredients for the base coat film-forming compositions include those which are well known in the art of surface coatings and include surfactants, flow control agents, thixotropic agents, fillers, anti-gassing agents, organic co-solvents, catalysts and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions typically are applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied over at least a portion of the base coat by any of the methods of application described above. As discussed above, the clear coat can be applied to a cured or a dried base coat before the base coat has been cured. In the latter case, the clear coat and the base coat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

Example A–F

Examples A and B are controls, describing the preparations of crosslinking agents without using the active hydrogen-containing compound (C). The remaining examples describe the preparation of crosslinking agents in accordance with the present invention. The crosslinking agents were prepared by modifying an appropriate melamine-based aminoplast resin.

Example A—Control

Into a 12-liter four-necked reaction kettle equipped with a thermometer, a mechanical stirrer, nitrogen inlet, and means for removing the by-product (methanol) were placed 5040.0 parts of CYMEL® 300 available from CYTEC Industries, Inc., 798.0 parts of Bisphenol A, 2506.0 parts of xylene, and 7.0 parts of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 19.3 parts of sodium carbonate were added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 38° C. The benzoxazine structure formed in the product was confirmed by NMR spectroscopy.

Example B—Control

Into a 2-liter four-necked reaction kettle equipped with a thermometer, a mechanical stirrer, nitrogen inlet, and means for removing the by-product (methanol) were placed 560.0 parts of Cymel® 300, 111.0 parts of 2,5-di-tert-butyl hydroquinone, 287.7 parts of xylene, and 0.24 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 0.66 part of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid. The benzoxazine structure formed in the product was confirmed by NMR spectroscopy.

Example C

Into a 2-liter four-necked reaction kettle equipped with a thermometer, a mechanical stirrer, nitrogen inlet, and means for removing the by-product (methanol) were placed 800.0 parts of Cymel® 300, 114.0 parts of Bisphenol A, 106.0 parts of benzoin, 437.3 parts of xylene, and 0.22 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. Thereafter, the mixture was concentrated at a temperature of 100–130° C. in a vacuum of 3–50 mm Hg to remove the xylene solvent. The product thus obtained was a pale yellow solid with a softening temperature of around 40° C. The benzoxazine structure formed in the product was confirmed by NMR spectroscopy.

Example D

Into a 2-liter four-necked reaction kettle equipped with a thermometer, a mechanical stirrer, nitrogen inlet, and means for removing the by-product (methanol) were placed 576.0 parts of Cymel® 300, 91.2 parts of Bisphenol A, 123.2 parts of isoborneol, 338.8 parts of xylene, and 0.30 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. Thereafter, the mixture was concentrated at a temperature of 100–130° C. in a vacuum of 3–50 mm Hg to remove the xylene solvent. The product thus obtained was a pale yellow solid with a softening temperature of around 38° C. The benzoxazine structure formed in the product was confirmed by NMR spectroscopy.

Example E

Into a 2-liter four-necked reaction kettle equipped with a thermometer, a mechanical stirrer, nitrogen inlet, and means for removing the by-product (methanol) were placed 720.0 parts of Cymel® 300, 114.0 parts of Bisphenol A, 106.0 parts of benzoin, 154 parts of isoborneol, 469.6 parts of xylene, and 0.48 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. Thereafter, the mixture was concentrated at a temperature of 100–130° C. in a vacuum of 3–50 mm Hg to remove the xylene solvent. The product thus obtained was a pale yellow solid with a softening temperature of around 42° C. The benzoxazine structure formed in the product was confirmed by NMR spectroscopy.

Example F

Into a 2-liter four-necked reaction kettle equipped with a thermometer, a mechanical stirrer, nitrogen inlet, and means for removing the by-product (methanol) were placed 720.0 parts of Cymel® 300, 114.0 parts of Bisphenol A, 106.0 parts of benzoin, 108 parts of benzyl alcohol, 469.6 parts of xylene, and 0.48 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. Thereafter, the mixture was concentrated at a temperature of 100–130° C. in a vacuum of 3–50 mm Hg to remove the xylene solvent. The product thus obtained was a pale yellow solid with a softening temperature of around 32° C. The benzoxazine structure formed in the product was confirmed by NMR spectroscopy.

Powder Coating Compositions

Examples 1–5

For each of the powder coating compositions of Examples 1–5, all of the listed components were blended for 10 seconds at 3500 rpm in a PRISM blender. The powders were then fed through a 19 millimeter, twin screw extruder available from b&p Process Equipment and Systems, by way of an ACCU-RATE auger feeder. The resulting chip was classified to a median particle size of approximately 40 microns. Note that Example 1 is a control, describing the preparation of a coating composition using a control crosslinking agent.

| Example No | 1 | 2 | 3 | 4 | 5 |
|---|---|---|---|---|---|
| Fine Clad M 8100 [1] | 270 g | 270 g | 270 g | 270 g | 270 g |
| Example A crosslinker | 33 g | | | | |
| Example C crosslinker | | 33 g | | | |
| Example E crosslinker | | | 33 g | | |
| Example D crosslinker | | | | 33 g | |
| Example F crosslinker | | | | | 33 g |
| Morpholine Tosylate [2] | 0.35 g | 0.35 g | 0.35 g | 0.35 g | 0.35 g |
| Resiflow PL 200 [3] | 4 g | 4 g | 4 g | 4 g | 4 g |
| Microwax C [4] | 3.0 g | 3.0 g | 3.0 g | 3.0 g | 3.0 g |
| R706 [5] | 170 g | 170 g | 170 g | 170 g | 170 g |

[1] FineClad M-8100 is a 25 hydroxyl functional resin from Reichhold Chemicals, Inc.
[2] Morpholine Tosylate is a blocked acid catalyst from Cytec Industries, Inc.
[3] Resiflow PL 200 is an acrylic flow aid from Monsanto Chemical Company.
[4] Microwax C is a stearamide wax from Hoechst Aktiengesellschaft.
[5] R706 is TiO2 from E.I. du Pont de Nemours and Company.

Testing Procedures:

The powder storage stability of each powder coating composition was evaluated by storing a 20 g sample of each powder coating composition at a temperature of 40° C. for a 24 hour period. The stability of the powder was determined upon visual inspection. Powder stability results are reported from best to worst as follows: excellent, good, slightly cakey, cakey, slightly clumpy, clumpy, fused and sintered.

The propensity of the coating composition to "gas" upon curing was tested by increasing the cured film thickness of the powder coating on a test panel until surface defects (i.e., pinholes) formed due to the escape of gases through the coating surface during the cure process. Values reported represent the maximum film thickness achieved just prior to the development of the pinholes in the coating surface.

Chemical resistance was evaluated by double rubs using methyl ethyl ketone. Results reported are the extent of film surface marring or softening in the area contacted with the methyl ethyl ketone after 100 double rubs.

Mar resistance was evaluated as follows. The initial 20° gloss of the cured powder coating of each example was measured using a 20° NOVO-GLOSS 20 statistical glossmeter, available from Gardner Instrument Company, Inc. Each coated substrate was then subjected to scratch testing by linearly scratching the cured coating surface to which an abrasive, such as BON AMI®, had been applied, for ten double rubs using an Atlas AATCC Scratch Tester, Model CM-5, available from Atlas Electrical Devices Company of Chicago, Ill. The test panels were then rinsed with tap water and carefully patted dry with a paper towel. The 20° gloss was measured on the scratched area of each test panel. The number reported is the percent of the initial gloss retained after scratch testing, i.e., 100%×scratched gloss/initial gloss.

The degree of gloss and the degree of haziness (or lack of film clarity) of the cured powder coating was measured using BYK HAZE/GLOSS instrument from BYK Chemical. Higher numbers indicate a higher degree of gloss and haziness.

Flexibility and impact resistance (both direct and reverse impact) was evaluated using a Gardner Impact Tester in accordance with ASTM-D-2794.

Two sets of test panels were prepared. Test results are reported in the following Table 1 for the set of test panels coated with each of the powder coating compositions of Examples 1 through 5 which were cured at 380° F. (193.3° C.) for 20 minutes. Test results for an analogous set of coated test panels which were cured at 320° F. (160° C.) for 20 minutes are reported below in the following Table 2.

TABLE 1

| | 1 | 2 | 3 | 4 | 5 |
|---|---|---|---|---|---|
| MEK double rubs | 100 no mar | 100 no mar | 100 no mar | 100 no mar | 100 no mar |
| Gas resistance | 2.2 mil | 3.0 mil | 2.8 mil | 2.1 mil | 4.1 mil |
| Powder stability/40C 1 day | Excellent | Excellent | Excellent | Excellent | Excellent |
| Powder stability/40C 1 week | Excellent | Excellent | Excellent | Clumpy | Excellent |
| Direct Impact (in-lbs.) | 160 | 160 | 160 | 160 | >140 |
| Reverse Impact (in-lbs.) | 160 | 160 | 160 | 160 | >140 |
| Gel Times | 20 sec | 15 sec | 2 min 10 sec | 2 min 15 sec | 1 min 55 sec |
| Mar (20 Crockmeter) | 81.9 | 76.1 | 96.7 | 94.3 | 95.3 |
| Mar (30 Soft Scrub) | 85.2 | 69.3 | 63.7 | 80 4 | 47 3 |
| Gloss 20°/60° | 12.1/52.0 | 36.8/79.4 | 29.2/76.3 | 13.9/55.7 | 27.8/77.1 |
| Pencil Hardness | 2B | HB | B- | B | HB |

*Mar is reported as % gloss retention

TABLE 2

| | 1 | 2 | 3 | 4 | 5 |
|---|---|---|---|---|---|
| MEK double rubs | 100 marred | 100 marred | 100 marred | 100 marred | 100 sl mar |
| Direct Impact (in-lbs.) | <20 | <20 | <20 | <20 | 20 |
| Reverse Impact (in-lbs.) | <20 | <20 | <20 | <20 | <20 |
| Mar (20 Crockmeter) | 100 | 50.3 | 95.2 | 97.1 | 92.6 |
| Mar (30 Soft Scrub) | 74.5 | 56.7 | 53.1 | 55.1 | 39.7 |
| Gloss 20°/60° | 23.0/69.5 | 46.5/86.0 | 47.4/85.2 | 42.2/83.9 | 40.2/86.9 |
| Pencil Hardness | HB | F- | HB | HB | F |

*Mar is reported as % gloss retention

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A cross linking agent having reactive benzoxazine groups comprising an ungelled reaction product of the following reactants:
(A) at least one aminoplast resin;
(B) at least one polyhydric aromatic compound; and
(C) at least one compound different from (B) having active hydrogen groups reactive with aminoplast resin (A), said compound selected from at least one of:
(i) compounds having the following structure (I):

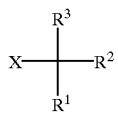

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with the aminoplast resin (A);
(ii) compounds having the following structure (IL) or (in):

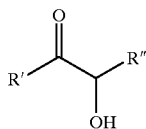

(II)

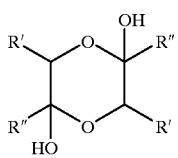

(III)

where R' and R" are the same or different and each independently represents an aromatic group or an alkyl group having 1 to 12 carbon atoms; and
(iii) compounds different from (i) and (ii) and having a melting point of at least 80° C.,
wherein said crosslinking agent has a glass transition temperature of at least 10° C. and is essentially free of functional groups which are reactive wit aminoplast resin.

2. The crosslinking agent of claim 1, wherein the aminoplast resin (A) is or is derived from at least one of aminotriazine and benzoguanamine.

3. The crosslinking agent of claim 2, wherein the aminoplast resin (A) comprises (alkoxyalkyl) aminotriazine having one or less non-alkylated NH bond per triazine ring.

4. The crosslinking agent of claim 3, wherein the aminoplast resin (A) comprises (methoxymethyl) aminotriazine.

5. The crosslinking agent of claim 3, wherein the (alkoxyalkyl) aminotriazine has a degree of polymerization of 1.75 or less.

6. The crosslinking agent of claim 1, wherein the molar ratio of the aminoplast resin (A) to the combined moles of polyhydric aromatic compound (B) and the active H-containing compound (C) ranges from 1.5 to 5.0:1.

7. The crosslinking agent of claim 1, wherein the polyhydric aromatic compound (B) is represented by the following structure (IV) or (V):

(IV)

or

(V)

where $\Phi^1$, $\Phi'^1$ and $\Phi^2$ are the same or different and each independently represents a divalent aromatic group; and Y represents a polyvalent linking group.

8. The crosslinking agent of claim 7, wherein the polyhydric aromatic compound (B) is selected from the group consisting of 4,4'-isopropylidenediphenol, bis(4-hydroxyphenyl)methane, 2,2'-biphenol, dihydroxynaphthalene, resorcinol, hydroquinone, catechol and mixtures thereof.

9. The crosslinking agent of claim 8, wherein the polyhydric aromatic compound (B) comprises 4,4'-isopropylidenediphenol.

10. The crosslinking agent of claim 1, wherein the compound (C) comprises at least one of compound (C)(i).

11. The crosslinking agent of claim 10, wherein at least one of $R^1$, $R^2$, and $R^3$ represents a group comprising an active hydrogen-containing group selected from hydroxyl, amide, amine, carboxylic acid, carbamate, urea, thiol and mixtures thereof.

12. The crosslinking agent of claim 10, wherein at least one of $R^1$, $R^2$, and $R^3$ represents a group comprising at least one hydroxyl group.

13. The crosslinking agent of claim 12, wherein the compound (C) comprises benzyl alcohol.

14. The crosslinking agent of claim 1, wherein the compound (C) comprises at least one of compound (C)(ii).

15. The crosslinking agent of claim 14, wherein the compound (C) comprises a hydroxyl functional group-containing compound having the following structure (II):

(II)

or dimer derivatives thereof wherein R' and R" are the same or different and each independently represents an (cyclo) alkyl group having 1 to 12 carbon atoms or an aromatic group.

16. The crosslinking agent of claim 15, wherein one or both of R' and R" represent aromatic groups.

17. The crosslinking agent of claim 16, wherein the compound (C) comprises a compound selected from benzoin, hydroxycyclohexyl phenyl ketone and mixtures thereof.

18. The crosslinking agent of claim 17, wherein the compound (C) comprises benzoin.

19. The crosslinking agent of claim 17, wherein the compound (C) comprises hydroxycyclohexyl phenyl ketone.

20. The crosslinking agent of claim 15, wherein one or both of R' and R" are aromatic groups containing at least one heteroatom selected from furyl, pyridyl, methoxy phenyl, and dimethylaminophenyl groups.

21. The crosslinking agent of claim 14, wherein the active hydrogen group-containing compound (C) comprises a compound having the following structure (III):

(III)

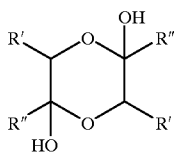

wherein R' and R" are the same or different and each independently represents an alkyl group having 1 to 12 carbon atoms or an aromatic group.

22. The crosslinking agent of claim 1, wherein the compound (C) comprises at least one of compound (C)(iii).

23. The crosslinking agent of claim 22, wherein compound (C) comprises an aliphatic monofunctional alcohol selected from borneol, norbarneol, isoborneol, 1-adamantanemethanol, 1-adamantanol, 2-methyl-2-adaniantanol and 5-norbornen-2-ol.

24. The crosslinking agent of claim 1, wherein the compound (C) comprises a compound selected from benzoin, isoborneol, triphenylmethanol, N-tert-butylacrylamide, p-acetophenetidide and mixtures thereof.

25. The crosslinking agent of claim 1 comprising an ungelled reaction product of the following:
(A) at least one aminoplast resin comprising (alkoxyalkyl) aminotriazine having one or less non-alkylated NH bond per triazine ring;
(B) at least one polyhydric aromatic compound selected from 4,4'-isopropylidenediphenol, bis(4-hydroxyphenyl)methane, 2,2'-biphenol, dihydroxynaphthalene, resorcinol, hydroquinone, catechol and mixtures thereof; and
(C) at least one compound different from (B) selected from benzoin, isoborneol, benzyl alcohol and mixtures thereof,
wherein said crosslinking agent has a glass transition temperature of at least 10° C. and is essentially free of hydroxyl groups.

26. A method for preparing a powder crosslinking agent comprising the following steps:
(1) combining the following reactants:
(A) at least one aminoplast resin;
(B) at least one polyhydric aromatic compound; and
(C) at least one compound different from (B) having active hydrogen groups reactive with aminoplast resin (A), said compound selected from at least one of:
(i) compounds having the following structure (I):

(I)

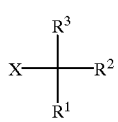

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with the aminoplast resin (A);

(ii) compounds having the following structure (II) or (III):

(II)

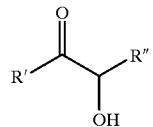

(III)

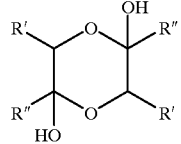

where R' and R" are the same or different and each independently represents an aromatic group or an alkyl group having 1 to 12 carbon atoms; and
(iii) compounds different from (i) and (ii) and having a melting paint of at least 80° C.,
such that the ratio of moles of aminoplast resin (A) to the total combined moles of (B) and (C) ranges from 1.5 to 5.0:1, to form a reaction admixture;
(2) heating the reaction admixture formed in step (1) to a temperature ranging from 90° to 135° C.; and
(3) maintaining the temperature achieved in step (2) for a time sufficient to produce an ungelled reaction product having a glass transition temperature of at least 10° C. which is essentially free of hydroxyl functionality as determined by infrared spectroscopy.

27. The method of claim 26, wherein the aminoplast resin (A) is or is derived from at least one of aminotriazine and benzoguanamine.

28. The method of claim 27, wherein the aminoplast resin (A) comprises (alkoxyalkyl) aminotriazine having one or less non-alkylated NH bond per triazine ring.

29. The method of claim 28, wherein the aminoplast resin (A) comprises (methoxymethyl) aminotriazine.

30. The method of claim 26, wherein the polyhydric aromatic compound (B) is represented byte following structure (IV) or (V):

$$HO\text{-}\Phi^1\text{-}Y\text{-}\Phi'^1\text{-}OH \qquad (IV)$$

or $$HO\text{-}\Phi^2\text{-}OH \qquad (V)$$

where $\Phi^1$, $\Phi'^1$ and $\Phi^2$ are the same or different and each independently represents a divalent aromatic group; and Y represents a polyvalent linking group.

31. The method of claim 26, wherein the polyhydric aromatic compound (B) is selected from the group consisting of 4,4-isopropylidenediphenol bis(4-hydroxyphenyl) methane 2,2'-biphenol, dihydroxynaphthalene, resorcinol, hydroquinone, catechol and mixtures thereof.

32. The method of claim 31, wherein the polyhydric aromatic compound (B) comprises 4,4'-isopropylidenediphenol.

33. The method of claim 26, wherein the compound (C) comprises at least one of compound (C)(i).

34. The method of claim 33, wherein at least one of $R^1$, $R^2$, and $R^3$ represents a group comprising an active hydrogen-containing group selected from hydroxyl, amide, amine, carboxylic acid, carbamate, urea, thiol and mixtures thereof.

35. The method of claim 33, wherein at least one of $R^1$, $R^2$, and $R^3$ represents a group comprising at least one hydroxyl group.

36. The method of claim 35, wherein the compound (C) comprises benzyl alcohol.

37. The method of claim 26, wherein the compound (C) comprises at least one of compound (C)(ii).

38. The method of claim 37, wherein the compound (C) comprises a hydroxyl functional group-containing compound having the following structure (II):

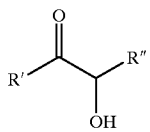
(II)

or dimer derivatives thereof, wherein R' and R" are the same or different and each independently represents an (cyclo) alkyl group having 1 to 12 carbon atoms or an aromatic group.

39. The method of claim 38, wherein compound (C) comprises a compound selected from benzoin, hydroxycyclohexyl phenyl ketone, isoborneol and mixtures thereof.

40. The method of claim 26, wherein compound (C) comprises at least one of compound (C)(iii).

41. The method of claim 34 comprising the following steps:
(1) combining the following reactants:
   (A) at least one aminoplast resin comprising (alkoxyalkyl)aminotriazine having one or less non-alkylated Nil bond per triazine ring;
   (B) at least one polyhydric aromatic compound selected from the group consisting of 4,4'-isopropylidenediphenol, bis(4-hydroxyphenyl) methane, 2,2'-biphenol, dihydroxynaphthalene, resorcinol, hydroquinone, catechol and mixtures thereof; and
   (C) at least one compound different from (B) selected from benzoin, isoborneol, benzyl alcohol and mixtures thereof, to form a reaction admixture;
(2) heating the reaction admixture formed in step (1) to a temperature ranging from 90° C. to 135° C.; and
(3) maintaining the temperature achieved in (2) for a time sufficient to obtain an ungelled reaction product having a glass transition temperature of at least 10° C. (PC which is essentially free of active hydrogen-containing groups as determined by infrared spectroscopy.

42. A curable powder coating composition comprising a solid particulate, film-forming mixture of the following components:
(1) a polymer having functional groups reactive with aminoplast and/or benzoxazine groups, said polymer having a glass transition temperature of at least 30° C.; and
(2) a crosslinking agent having reactive benzoxazine groups comprising an ungelled reaction product of the following reactants:
   (A) at least one aminoplast resin;
   (B) at least one polyhydric aromatic compound; and
   (C) at least one compound different from (B) having active hydrogen groups reactive with aminoplast resin (A), said compound selected from at least one of:
   (i) compounds having the following structure (I):

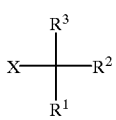
(I)

wherein X is aromatic; $R^1$, $R^2$, and $R^3$ can be the same or different and each independently represents H, (cyclo) alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (A);

(ii) compounds having the following structure (II) or (III):

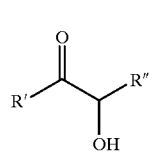
(II)

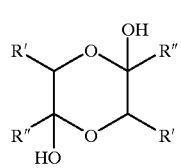
(III)

where R' and R" are the same or different and each independently represents an aromatic group or an alkyl group having 1 to 12 carbon atoms; and (iii) compounds different from (i) and (ii) and having a melting point of at least 80° C., wherein said crosslinking agent has a glass transition temperature of at least 10° C. and is essentially free of functional groups which are reactive with aminoplast resin (A).

43. The curable powder coating composition of claim 42, wherein the polymer (1) is selected from the group consisting of acrylic, polyester, polyurethane, polyepoxide and polyether polymers and mixtures thereof.

44. The curable powder coating composition of claim 42, wherein the polymer (1) contains functional groups selected from the group consisting of hydroxyl, primary and secondary amine, carbamate, amide, thiol, phenolic, carboxyl, and epoxy functional groups, and mixtures thereof.

45. The curable powder coating composition of claim 42, wherein the polymer (1) contains hydroxyl and/or carbamate functional groups.

46. The curable powder coating composition of claim 42, wherein the polymer (1) contains hydroxyl and/or epoxy functional groups.

47. The curable powder coating composition of claim 42, wherein the polymer (1) has a glass transition temperature ranging from 30° C. to 80° C.

48. The curable powder coating composition of claim 42, wherein the polymer (1) is present in an amount ranging from 5 to 90 percent by weight based on total weight of the composition.

49. The curable powder coating composition of claim 42, wherein aminoplast resin (A) is or is derived from at least one of aminotriazine and benzoguanamine.

50. The curable powder coating composition of claim 49, wherein the aminoplast resin (A) comprises (alkoxyalkyl) aminotriazine having one or less non-alkylated NH bond per triazine ring.

51. The curable powder coating composition of claim 50, wherein the aminoplast resin (A) comprises (methoxymethyl) aminotriazine.

52. The curable powder coating composition of claim 42, wherein the polyhydric aromatic compound (B) is represented by the following structure (IV) or (V):

$$HO-\Phi^1-Y-\Phi'^1-OH \quad (IV)$$

or $$HO-\Phi^2-OH \quad (V)$$

where 01, CIA and (1)2 are the same or different and each independently represents a divalent aromatic group; and Y represents a polyvalent linking group.

53. The curable powder coating composition of claim 52, wherein the polyhydric aromatic compound (B) is selected from the group consisting of 4,4'-isopropylidenediphenol, bis(4-hydroxyphenyl)methane, 2,2'-biphenol, dihydroxynaphthalene, resorcinol, hydroquinone, catechol and mixtures thereof.

54. The curable powder coating composition of claim 53, wherein the polyhydric aromatic compound (B) comprises 4,W-isopropylidenediphenol.

55. The curable powder coating composition of claim 42, wherein the compound (C) comprises at least one of compound (C)(i).

56. The curable powder coating composition of claim 55, wherein at least one of $R^1$, $R^2$, and $R^3$ represents a group comprising an active hydrogen-containing group selected from hydroxyl, amide, amine, carboxylic acid, carbamate, urea, thiol and mixtures thereof.

57. The curable powder coating composition of claim 55, wherein at least one of $R^1$, $R^2$, and $R^3$ represents a group comprising at least one hydroxyl group.

58. The curable powder coating composition of claim 57, wherein the compound (C) comprises benzyl alcohol.

59. The curable powder coating composition of claim 42, wherein the compound (C) comprises at least one of compound (C)(ii).

60. The curable powder coating composition of claim 42, wherein the compound (C) comprises a hydroxyl functional group-containing compound having the following structure (II):

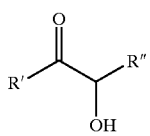

(II)

or dimer derivatives thereof, wherein R' and R" are the same or different and each independently represents an (cyclo) alkyl group having 1 to 12 carbon atoms or an aromatic group.

61. The curable powder coating composition of claim 60, wherein compound (C) comprises a compound selected from benzoin, hydroxycyclohexyl phenyl ketone, isoborneol and mixtures thereof.

62. The curable powder coating composition of claim 42, wherein compound (C) comprises at least one of compound (C) (iii).

63. The curable powder coating composition of claim 42 comprising a solid particulate film-forming mixture of the following components:

(1) a polymer having reactive functional groups selected from hydroxyl, epoxy, and carbamate groups, and combinations thereof, said polymer having a glass transition temperature of at least 30° C.; and (2) a crosslinking agent having reactive benzoxazine groups comprising an ungelled reaction product of the following reactants:

(A) at least one aminoplast resin comprising (alkoxyalkyl)aminotriazine having one or less non-alkylated NH bond per triazine ring;

(B) at least one polyhydric aromatic compound selected from the group consisting of 4,4'-isopropylidenediphenol, bis(4-hydroxyphenyl) methane, 2,2'-biphenol, dihydroxynapthalene, resorcinol, hydroquinone, catechol, and mixtures thereof; and (C) at least one compound selected from benzoin, isoborneol, benzyl alcohol, and mixtures thereof, wherein said crosslinking agent is essentially free of functional groups which are reactive with the aminoplast resin (A) and has a glass transition temperature of at least 10° C.

64. The curable powder coating composition of claim 42, comprising a solid particulate film-forming mixture of the following components:

(1) a polymer having reactive epoxy functional groups, said polymer having a glass transition temperature of at least 30° C.; and (2) a crosslinking agent having reactive benzoxazine groups comprising an ungelled reaction product of the following reactants:

(A) at least one aminoplast resin comprising (alkoxyalkyl)aminotriazine having one or less non-alkylated NH bond per triazine ring;

(B) at least one polyhydric aromatic compound selected from the group consisting of 4,4'-isopropylidenediphenol, bis(4-hydroxyphenyl) methane, 2,2'-biphenol, dihydroxynaphthalene, resorcinol, hydroquinone, catechol, and mixtures thereof; and (C) at least one compound selected from benzoin, isoborneol, benzyl alcohol, and mixtures thereof;

wherein said crosslinking agent is essentially free of functional groups which are reactive with the aminoplast resin (A) and has a glass transition temperature of at least 10° C.; and (3) a crosslinking agent having carboxylic acid functional groups.

65. A multilayer composite coating composition comprising a base coat deposited from a base coating composition and a top coat deposited from a transparent powder top coating composition, the powder top coating composition comprising a solid particulate, film-forming mixture of the following components:

(1) a polymer having functional groups reactive with aminoplast resin and/or benzoxazine groups, said polymer having a glass transition temperature of at least 30° C.; and (2) a crosslinking agent having reactive benzoxazine groups comprising an ungelled reaction product of the following reactants:

(A) at least one aminoplast resin;
(B) at least one polyhydric aromatic compound; and
(C) at least one compound different from (B) having active hydrogen groups reactive with aminoplast resin (A), said compound selected from at least one of:
(i) compounds having the following structure (I):

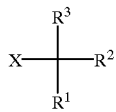

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with The aminoplast resin (A);
(ii) compounds having the following structure (H) or (III):

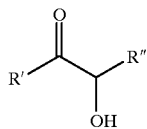

(II)

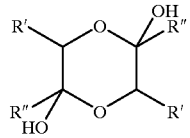

(III)

where R' and R" are the same or different and each independently represents an aromatic group or an alkyl group having 1 to 12 carbon atoms; and
(iii) compounds different from (i) and (ii) and having a melting point of at least 80° C.,
wherein said crosslinking agent has a glass transition temperature of at least 10° C. and is essentially free of functional groups which are reactive with aminoplast resin (A).

66. A substrate coated with the curable powder coating composition of claim 42.

67. A substrate coated with the multilayer composite coating composition of claim 65.

\* \* \* \* \*